US007392952B2

(12) United States Patent
Corcoran et al.

(10) Patent No.: US 7,392,952 B2

(45) Date of Patent: Jul. 1, 2008

(54) GIFT CARD ASSEMBLY

(75) Inventors: Suzanne D. Corcoran, West Hartford, CT (US); Brian D. Gallagher, Simsbury, CT (US); Daniel A. Hincks, Burlington, CT (US)

(73) Assignee: Data Management, Inc., Farmington, CT (US)

( * ) Notice: Subject to any disclaimer, the term of this patent is extended or adjusted under 35 U.S.C. 154(b) by 0 days.

(21) Appl. No.: 11/315,722

(22) Filed: Dec. 22, 2005

(65) Prior Publication Data

US 2006/0097055 A1 May 11, 2006

Related U.S. Application Data

(63) Continuation of application No. 11/146,552, filed on Jun. 6, 2005, now Pat. No. 7,007,853, which is a continuation of application No. 10/830,801, filed on Apr. 23, 2004, now abandoned.

(51) Int. Cl.
*G06K 19/00* (2006.01)
*G06K 19/06* (2006.01)
*B42D 15/00* (2006.01)

(52) U.S. Cl. ....................... 235/487; 235/492; 235/378; 235/493; 283/81; 283/60.1; 283/101

(58) Field of Classification Search ................... 283/81, 283/101, 55, 56, 60.1, 51, 74, 79; 235/487, 235/492, 493, 375, 378
See application file for complete search history.

(56) References Cited

U.S. PATENT DOCUMENTS 2,687,902 A * 8/1954 Becker ........................ 462/72
3,380,648 A * 4/1968 De Lyra ........................ 229/71
3,481,759 A * 12/1969 Ostlie .......................... 503/205
3,672,703 A * 6/1972 Jay ............................. 462/65
3,960,634 A * 6/1976 Kempster ................... 156/277
4,029,341 A * 6/1977 Neill et al. ..................... 462/56
4,103,935 A * 8/1978 Adler ......................... 283/66.1
4,159,129 A * 6/1979 Lockhart ..................... 462/67
4,277,089 A * 7/1981 Lockhart ..................... 462/67
4,394,038 A * 7/1983 Klein .......................... 462/55
4,448,445 A * 5/1984 Chang et al. ................ 503/206
4,465,306 A * 8/1984 Hincks et al. ................. 462/81
4,593,935 A * 6/1986 Kearns ........................ 462/21
4,643,453 A * 2/1987 Shapiro et al. ................ 283/73
4,643,455 A * 2/1987 North et al. ................... 283/81
4,689,018 A * 8/1987 Trinity ....................... 434/109
4,741,558 A * 5/1988 Louis .......................... 462/55

(Continued)

OTHER PUBLICATIONS

Custom Card Canada- Manual Gift Cards. www.customcardcanada.com/customgift_manualgifts.html.*

*Primary Examiner*—Daniel I Walsh

(57) ABSTRACT

A gift card system includes a gift card imprinted with indicia identifying the issuer, an adhesively coated security label permanently adhered to the card and imprinted on one surface with the value of the gift, and a gift record for recording information concerning the gift including the date of issuance and the value thereof. A recording sheet providing the gift record and the opposite surface of the substrate and the face of the recording sheet have cooperating interactive coatings thereon to imprint the recording sheet. A second security label is substantially permanently adhered on the first security label and imprinted with a reduced value to reflect a partial charge against the value on the first mentioned security label.

9 Claims, 6 Drawing Sheets

U.S. PATENT DOCUMENTS 4,833,122 A * 5/1989 Doll et al. .................. 503/226
4,846,502 A * 7/1989 Chang et al. .................. 283/57
5,090,942 A * 2/1992 Traise .......................... 462/66
5,419,590 A * 5/1995 Rothschild ................... 283/79
5,478,279 A * 12/1995 McCormick ................. 462/25
5,531,482 A * 7/1996 Blank .......................... 283/67
5,640,447 A * 6/1997 Fonseca ................. 379/114.18
5,743,567 A * 4/1998 Warther ....................... 283/61
5,887,905 A * 3/1999 Collins ........................ 283/81
6,000,724 A * 12/1999 Holway ..................... 283/66.1
6,082,776 A * 7/2000 Feinberg ...................... 283/72
6,345,766 B1 * 2/2002 Taskett et al. ............... 235/493
6,589,624 B1 * 7/2003 Lee ........................... 428/40.1
6,945,564 B2 * 9/2005 Hernandez ................. 283/63.1
7,007,853 B2 * 3/2006 Corcoran et al. ............ 235/487
7,040,049 B2 * 5/2006 Cox et al. .............. 40/124.191
2002/0079691 A1 * 6/2002 Zumberge .................... 283/81
2003/0028439 A1 * 2/2003 Cox et al. ...................... 705/26
2003/0160444 A1 * 8/2003 Durso ......................... 283/77
2004/0249748 A1 * 12/2004 Schultz et al. ................ 705/39
2005/0045715 A1 * 3/2005 Lombardino ................ 235/380
2005/0092826 A1 * 5/2005 Blackman ................... 235/380
2005/0204600 A1 * 9/2005 Lauer et al. ................... 40/594
2006/0022452 A1 * 2/2006 Lewis ........................ 283/66.1
2006/0065748 A1 * 3/2006 Halbur et al. ............... 235/493
2006/0213983 A1 * 9/2006 Walker et al. ............... 235/380
2006/0243792 A1 * 11/2006 Morello et al. .............. 235/380
2006/0255125 A1 * 11/2006 Jennings et al. ............. 235/380
2007/0203715 A1 * 8/2007 Kane ............................. 705/1
2007/0241197 A1 * 10/2007 Lindahl et al. .............. 235/487
2007/0246548 A1 * 10/2007 Schultz et al. .............. 235/494
2007/0284871 A1 * 12/2007 Gray ........................... 283/74

* cited by examiner

GIFT CARD ASSEMBLY

CROSS REFERENCE TO RELATED APPLICATION

The present application is a continuation of application Ser. No. 11/146,552 filed Jun. 6, 2005, now U.S. Pat. No. 7,007,853, which in turn is a continuation of application Ser. No. 10/830,801 filed Apr. 23, 2004, now abandoned.

BACKGROUND OF THE INVENTION

The present invention relates to gift cards and, more particularly, to a gift card system which is readily operated by manual entries on various components of the system.

Over the years, businesses have issued gift certificates to customers which are then provided to other persons for redemption by the purchase of merchandise from the issuing store. In recent years, electronic gift cards have been valued by swiping of the pertinent information into a computer system from the magnetic strip and/or bar code on the gift card, and this has been particularly the case with respect to issuers with multiple store locations since the data is then available in a central file.

Partial redemption of a gift certificate or card remains a problem and various techniques have been employed in an effort to accommodate the situation of a partial redemption and to avoid the dispensing of cash representing the difference between the partial redemption and the total value of the certificate. In some instances, this has involved the issuance of a new certificate or entries entered manually on the original gift certificate or card to reflect the reduction in value.

The manual imprinting of certificates has generally required separate manual recording of information in a record book with the potential for error and use of time for double entry of the information when the sales person may have customers waiting for other transactions.

It is an object of the present invention to provide a novel manual gift card system which is simple and enables relatively rapid generation of a gift card.

It is also an object to provide such a system which uses relatively economical components.

Another object is to provide such a system which enables simple generation of a certificate reflecting the balance on the gift following partial redemption.

SUMMARY OF THE INVENTION

It has now been found that the foregoing and related objects and advantages may be readily attained in a gift card system which includes a gift car imprinted with indicia identifying the issuer, and an adhesively coated security label permanently adhered to the card and manually imprinted on one surface with the value of the gift. A gift record is used to manually record information concerning the gift including the date of issuance and the value thereof.

A multiplicity of security labels have a reverse surface releasably mounted on one surface of a substrate. A recording sheet providing the gift record is provided behind the substrate and the opposite surface of the substrate and the face of the recording sheet have cooperating interactive coatings thereon to effect the imprinting of the register. The security label has security indicia imprinted thereon.

A second security label may be substantially permanently adhered on the first mentioned security label and imprinted with a reduced value to reflect a partial charge against the value on the first mentioned security label.

The gift record may include a ledger in which issuance of gift cards and redemption thereof are recorded. The security labels are paper with an adhesive coating on the rear surface thereof.

The card is fabricated from synthetic resin. The security labels may be readily peeled from the substrate.

The gift card issuance includes the steps of providing a gift card imprinted with indicia identifying the issuer, recording on a first surface of a security label the value of the gift. The other surface of the security label is adhered to the gift card. The date of issuance and the value of the gift are simultaneously recorded on a gift record.

BRIEF DESCRIPTION OF THE ILLUSTRATED DRAWINGS

DETAILED DESCRIPTION OF THE ILLUSTRATED EMBODIMENT

Figure 1:
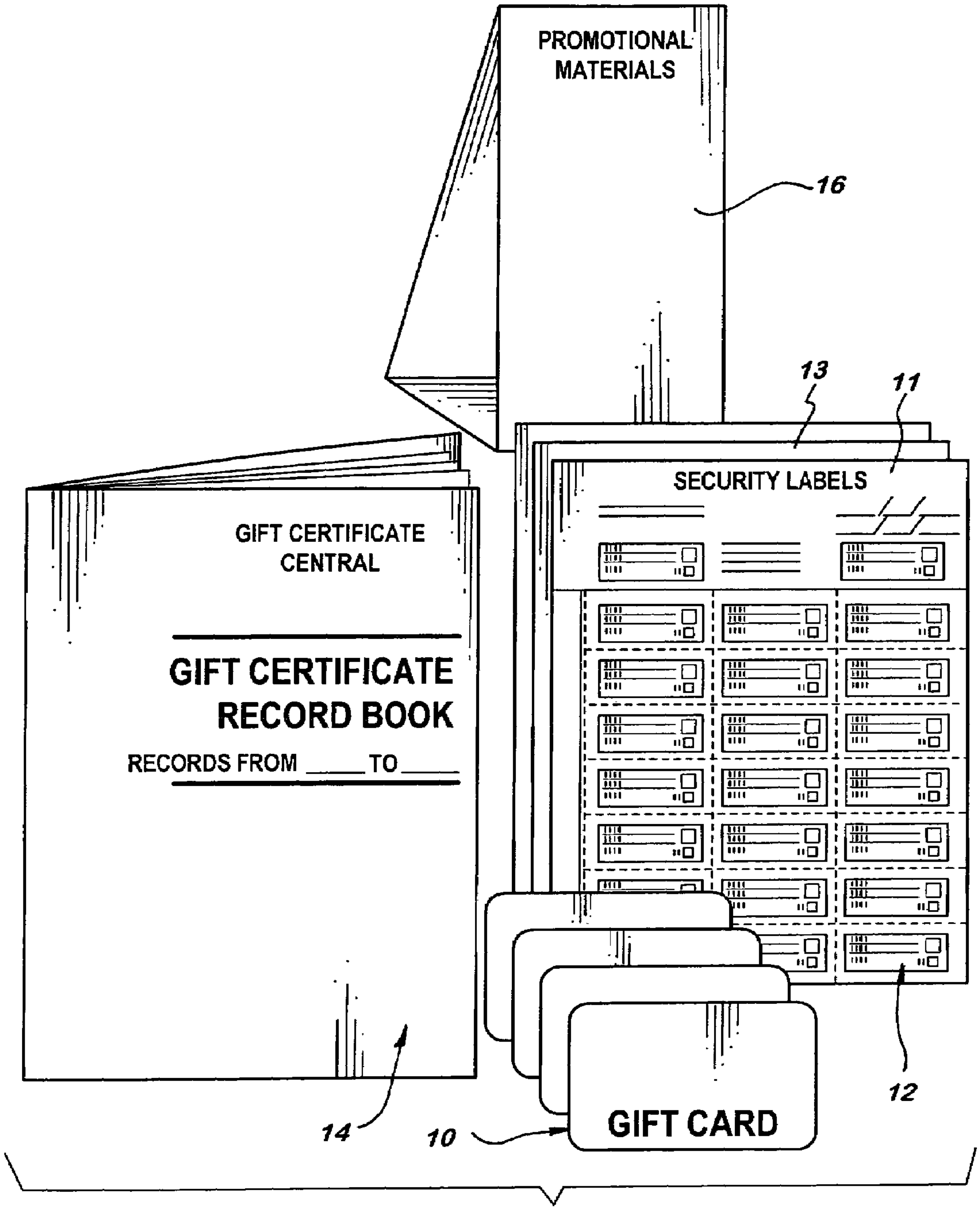
FIG. 1 is an illustration of the several components of a gift card program embodying the present invention.

Turning first to FIG. 1 of the attached drawings, the principal components of the gift card system of the present invention are illustrated therein as comprising a gift card generally designated by the numeral 10, a sheet or substrate 11 on which are adhered a multiplicity of security labels generally designated by the numeral 12, and a gift certificate record book generally designated by the numeral 14. Behind the security labels 12 is a substrate 11 and a recording sheet 13. Also shown is a poster 16 to provide the sale of the gift cards.

Figure 2:
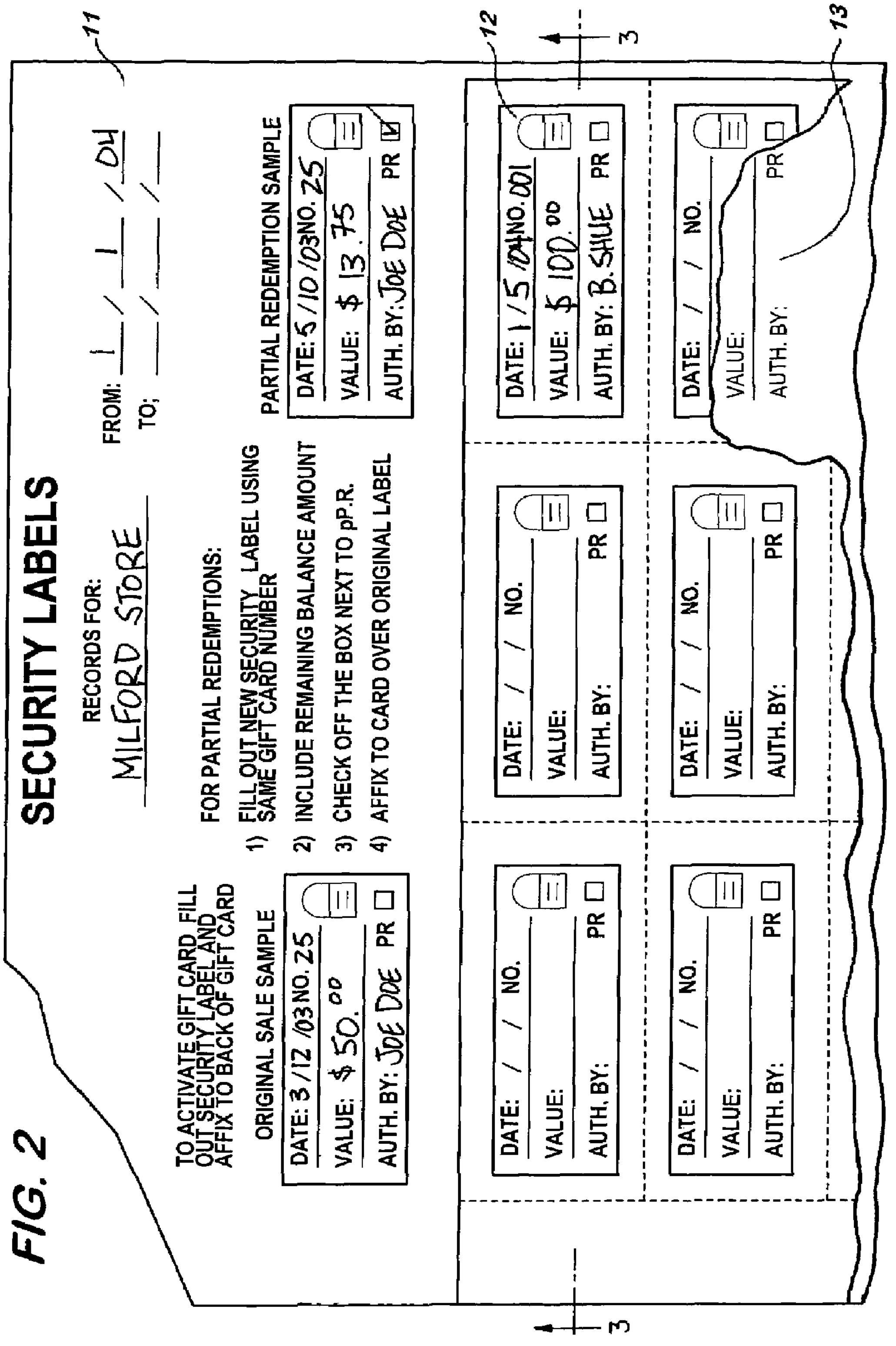
FIG. 2 is a fragmentary plan view of a security label sheet comprising a substrate upon which are releasably adhered a multiplicity of security labels, and a recording sheet.
Figure 3:
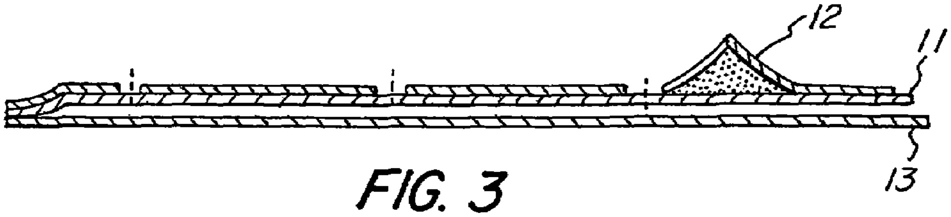
FIG. 3 is a fragmentary sectional view thereof along the line 3-3 of FIG. 4.

FIG. 2 fragmentarily shows a substrate or release paper-sheet 11 on which one releasably adhered security labels 12 by a coating of adhesive (not shown) on the reverse side of the labels 12. FIG. 3 is a fragmentarily sectional view along the line 3-3 of FIG. 2 with a label 12 being pulled from the substrate 11 and also showing the recording sheet 13.

The rear surface of the substrate 13 has a coating (not shown) which reacts with a coating (not shown) on the recording sheet 13 when microcapsules are ruptured by the pressure of the writing element to reproduce the indicia being entered onto the label 12 on the recording sheet 13.

Figure 4:
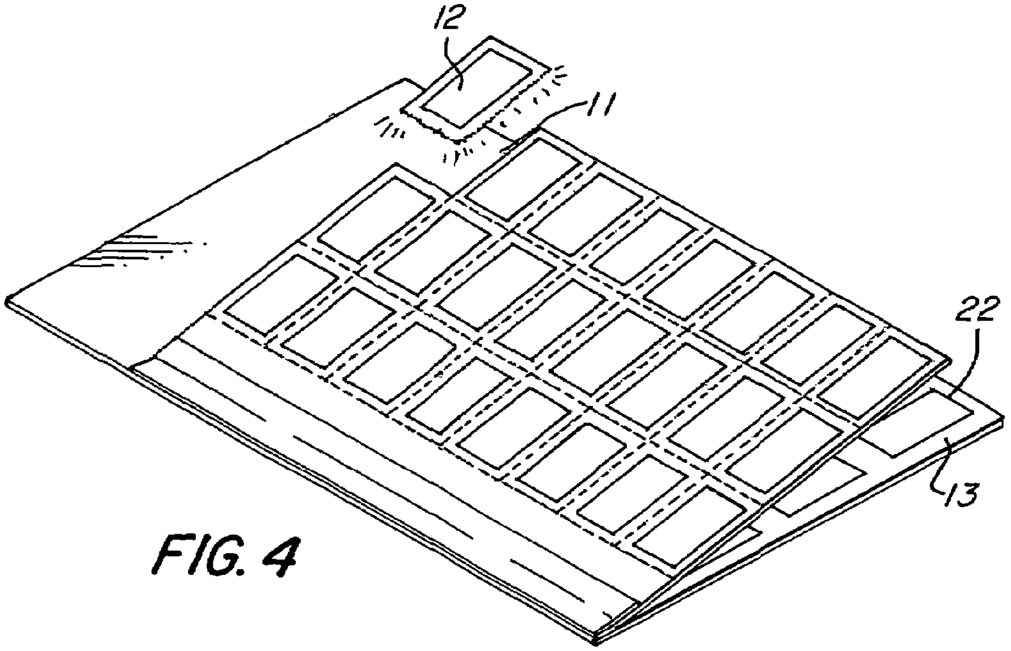
FIG. 4 is a perspective view thereof showing the individual labels on a substrate, and a recording sheet, a single certificate being shown in a removed position.
Figure 5:
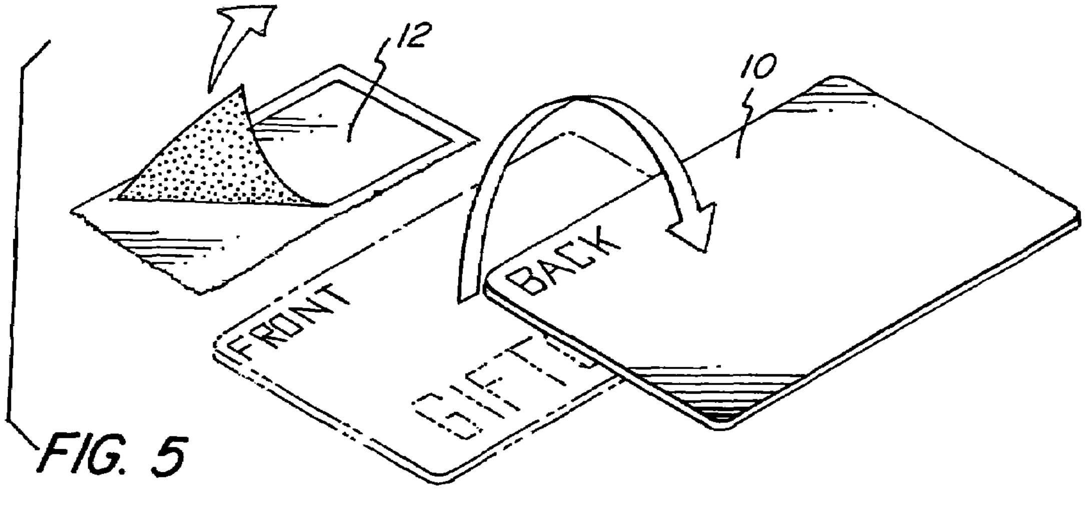
FIG. 5 is a schematic view of the gift card and security label prior to its mounting on the gift card.
Figure 6:
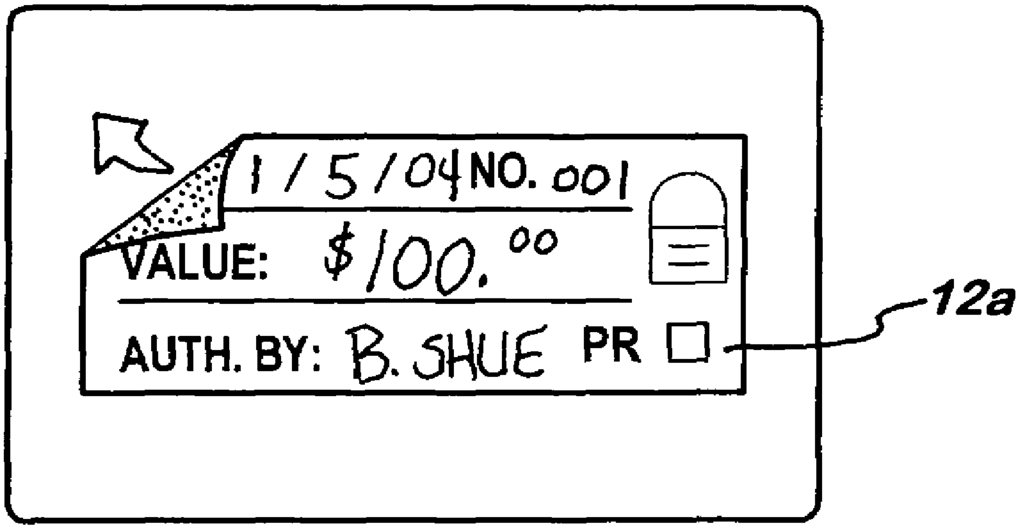
FIG. 6 is a plan view of a gift card with a security label being mounted thereon.
Figure 7:
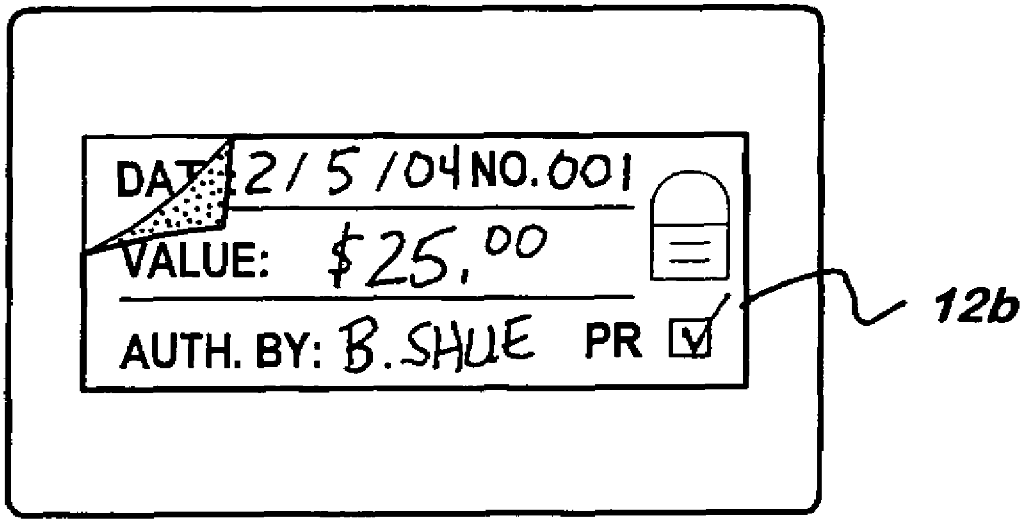
FIG. 7 is a similar view with a second security label being applied over the first label to reflect the reduced value of the card following partial redemption.

FIG. 4 shows the assembly of recording sheet 13, substrate 11 and security labels 12 which are generally provided as a set as illustrated. The recording sheet 13 is conveniently imprinted with border lines 22 cooperatively dimensioned with respect to the security labels to provide a clear separation of the information which will be imprinted thereon and corresponding to the entries on the corresponding security label 12. These will include the entries concerning date and value (and a check in the box for partial redemption when a new security label is to be affixed to the card), the imprinted security label 12 is peeled from the substrate 11 as seen in FIGS. 4 and 5 and affixed to the card 10 as seen in FIG. 6. If the security label 12*b* is to reflect a partial redemption, it is affixed over the original security label 12*a* as seen in FIG. 7.

Figure 8:
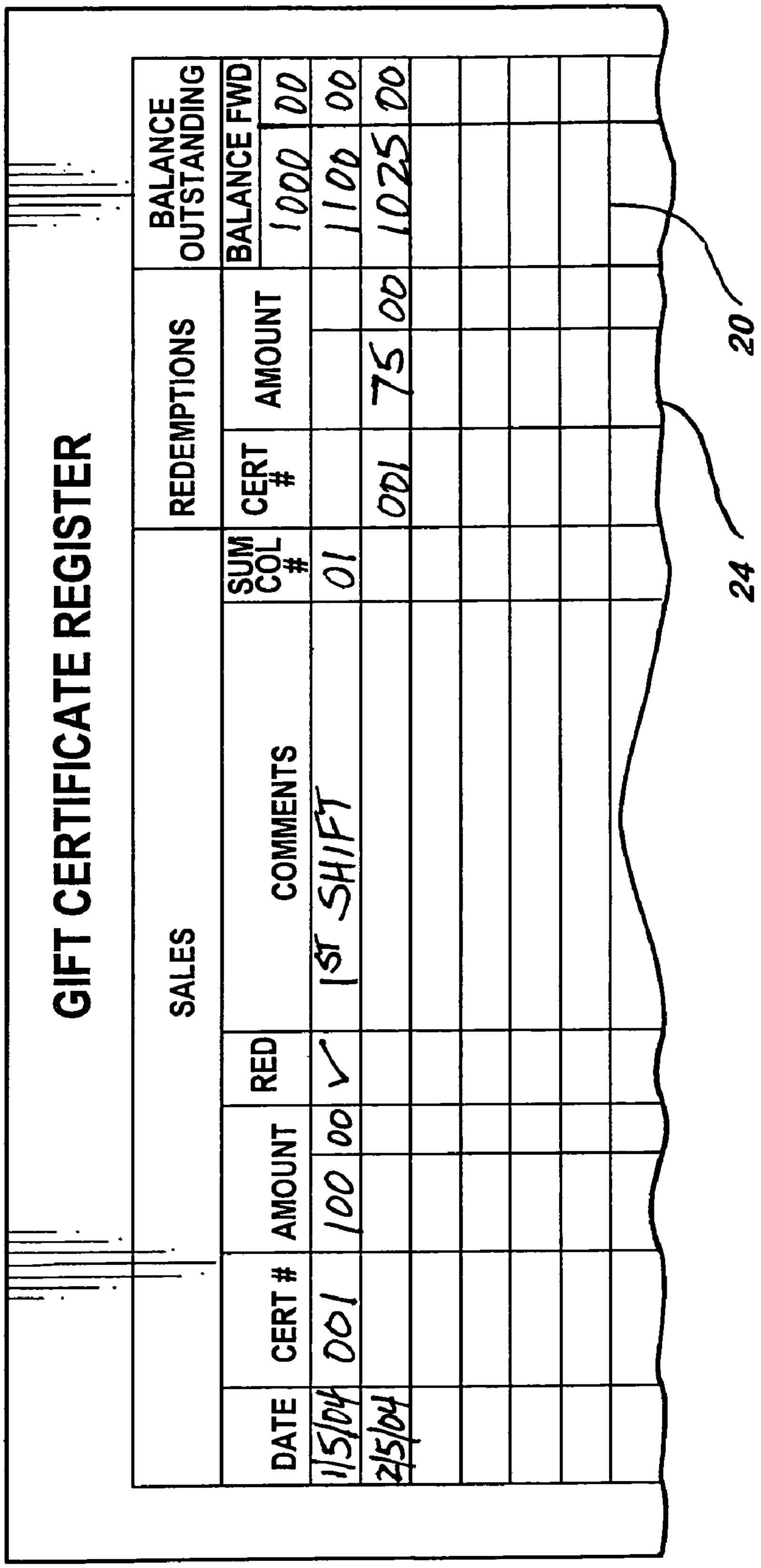
FIG. 8 is a fragmentary plan view of a sheet from a gift certificate register with information imprinted thereon to reflect two entries.

Turning next to the record book 14, it includes a multiplicity of certificate record pages 24 shown in FIG. 8, and the pages with a multiplicity of lines 26 defining columns and rows. The specific information to be recorded and the order can vary depending upon the desires of the program user. In the illustration of FIG. 8, the date of issuance, the certificate number and value of the certificate have been entered in the first row. Also entered is an entry as to the shift and the number 01 to reflect the issue of only one certificate on that date.

The second row reflects an entry of information concerning a partial redemption of the gift certificate on Feb. 5, 2004 for the amount of $75 which will result in the issuance of a second security label in the amount of the balance of $25. The rightmost column recaps the value of outstanding gift certificates.

Figure 9:
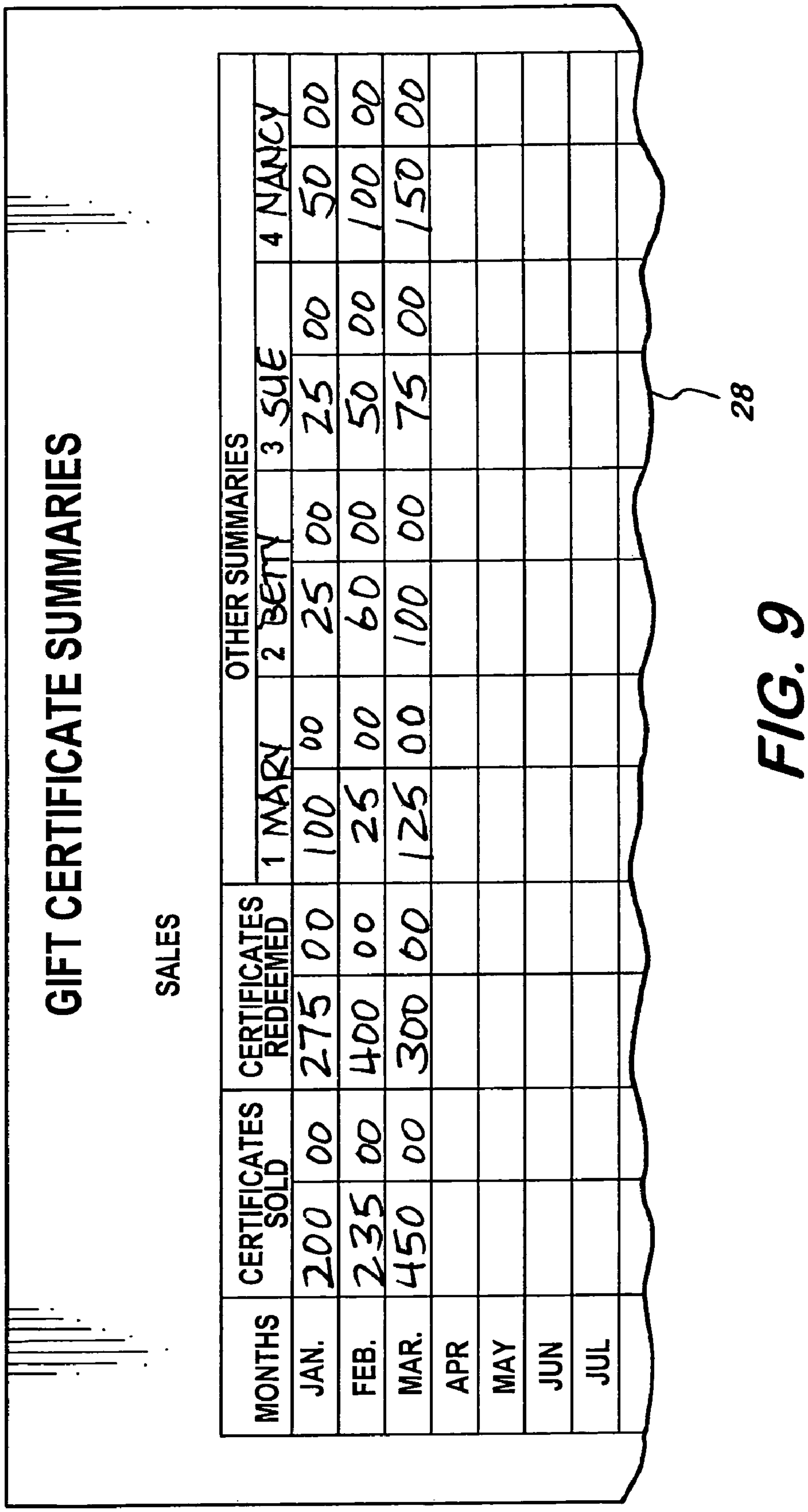
FIG. 9 is a fragmentary plan view of a gift certificate summary sheet with information imprinted thereon.

FIG. 9 shows a monthly summary sheet 28 for the value of gift certificates issued and the value of certificates redeemed. It also shows the value of certificates issued by the several salespersons.

The steps involved in the issuance of the card or in partial redemption are quickly and easily performed by any sales person. The information on the recording sheets 13 may be entered onto the record pages 24 by other personnel. A running account of the gift value outstanding may be kept by the entries on the certificate record pages 24 and monthly summary sheets 28.

The card is conveniently made of synthetic resin such as polyethylene or polypropylene. Although both the information concerning the issuer and the security label could be on the same side, generally it is preferable to imprint the issuer identification and marketing information on the front surface and to affix the security label to the rear surface as indicated in FIG. 5.

The security label is conveniently provided by paper stock imprinted on its front face with appropriate legends and ideally with security elements such as bar code, holographic image, etc. The label may also provide for authentication and other entries. The rear surface of the label is coated with a pressure sensitive adhesive which will bond to the surface of the card. Adhesion of the label to the card may be improved by surface treatment of the card, if so desired. The adhesive should also bond securely to the surface of an underlying label in the instance of a partial redemption.

The substrate is conveniently a paper stock provided on the front surface with a release coating to facilitate the removal of the security labels. The rear surface is coated with the first part of a reactive ink formulation.

The recording sheet is conveniently provided by a paper sheet imprinted with box-like images as seen in FIG. 4, and it may also duplicate all of the printed indicia on the security label. The front surface is coated with the second part of the reactive ink formulation. Thus, when the clerk enters the data on the security label, the pressure of the ball point pen or the like ruptures the microcapsules of one part of the reactive formulation to release an agent which reacts with the other part of the reactive formulation to replicate the data entered onto the recording sheet.

Although the gift cards are illustrated as having been imprinted with a monetary value, the value may be for services such as hairdressings or dry cleaning, or merchandise such as food items. The term "value" as used herein is intended to be generic to currency services and merchandise.

The gift cards may be displayed only since they have no value until provided with the security label, completed and authenticated.

Thus, it can be seen from the foregoing detailed specification and attached drawings that the manual gift card system of the present invention utilizes components which are relatively economical and which enable facile and rapid entry of the data reflecting the gift. Moreover, the manual entry of the information on the label to be affixed to the card simultaneously reproduces the information on a record sheet. Accordingly, entry of the data into ledgers or the like can be performed by personnel other than the sales clerk by personnel who are under less pressure.

Having thus described the invention, what is claimed is:

1. A gift card system comprising:

(a) a gift card imprinted with indicia identifying the issuer;

(b) a unitary security label adhesively coated on one surface and permanently adhered to said card, the other surface of said label being manually imprinted with indicia including the value of the gift card and a security label number;

c) a gift register manually imprinted with the same indicia imprinted upon the label to record information concerning the gift including the security label number and the value thereof;

(d) a substrate having one surface upon which a multiplicity of security labels have their said one surface releasably mounted; and (e) a recording sheet behind said substrate and having one surface providing said gift register, the opposite surface of said substrate and the face of said recording sheet having cooperating interactive coatings thereon to imprint said recording sheet with the information imprinted on said label.

2. The gift card system in accordance with claim 1 wherein said security label has security indicia imprinted thereon.

3. The gift card system in accordance with claim 1 wherein said security labels are paper with an adhesive coating on said one surface thereof.

4. The gift card system in accordance with claim 1 wherein said card is fabricated from synthetic resin.

5. A gift card system comprising:

a) a gift card imprinted with indicia identifying the issuer;

b) a unitary security label adhesively coated on one surface and permanently adhered to said card, the other surface of said label being manually imprinted with indicia including the value of the gift and the security label number, said security label having been removed from a supply having a substrate and a multiplicity of security labels with a reverse surface releasably mounted on one surface of said substrate;

c) a gift register manually imprinted with indicia recording the information imprinted upon said label concerning the gift including the security label number and the value thereof; and d) a recording sheet behind said substrate providing said gift register, the opposite surface of said substrate and the face of said recording sheet having cooperating interactive coatings thereon to imprint said recording sheet with the information imprinted on said label.

6. The gift card system in accordance with claim 5 wherein said security label has security indicia imprinted thereon.

7. The gift card system in accordance with claim 5 wherein said gift register includes a portion in which data regarding redemption thereof are recorded.

8. The gift card system in accordance with claim 5 wherein said security labels are paper with an adhesive coating on said one surface thereof.

9. The gift card system in accordance with claim 5 wherein said security labels may be readily peeled from said substrate.

* * * * *

UNITED STATES PATENT AND TRADEMARK OFFICE

CERTIFICATE OF CORRECTION

PATENT NO. : 7,392,952 B2 
APPLICATION NO. : 11/315722
DATED : July 1, 2008
INVENTOR(S) : Suzanne D. Corcoran, Brian D. Gallagher and Daniel Hincks It is certified that error appears in the above-identified patent and that said Letters Patent is hereby corrected as shown below:

Col. 4, Line 10
Claim 1, line 19, replace "gift including" with --gift card including--; same claim, line 29, after "label" insert --wherein additional security labels on the gift register are manually imprinted with both a reduced value of the gift card and the security label number and are permanently adhered over an existing security label permanently adhered to the gift card to reflect a remaining value of the gift card resulting from a purchase transaction of a value less than the value of the gift card.--.

Col. 4, Line 37
Claim 5, line 49, replace "gift including" with --gift card including--; same claim, line 55, after "label" insert --wherein additional security labels on the gift register are manually imprinted with both a reduced value of the gift card and the security label number and are permanently adhered over an existing security label permanently adhered to the gift card to reflect a remaining value of the gift card resulting from a purchase transaction of a value less than the value of the gift card.--.

Signed and Sealed this

Eleventh Day of November, 2008

JON W. DUDAS
*Director of the United States Patent and Trademark Office*